(12) United States Patent
Rahman et al.

(10) Patent No.: US 8,296,689 B1
(45) Date of Patent: Oct. 23, 2012

(54) CUSTOMIZING METAL PATTERN DENSITY IN DIE-STACKING APPLICATIONS

(75) Inventors: Arifur Rahman, San Jose, CA (US); Hong-tsz Pan, Cupertino, CA (US)

(73) Assignee: Xilinx, Inc., San Jose, CA (US)

( * ) Notice: Subject to any disclaimer, the term of this patent is extended or adjusted under 35 U.S.C. 154(b) by 323 days.

(21) Appl. No.: 12/419,234

(22) Filed: Apr. 6, 2009

(51) Int. Cl.
*G06F 17/50* (2006.01)
(52) U.S. Cl. .......... 716/55; 716/54; 716/111; 716/119
(58) Field of Classification Search .............. 716/10, 716/51, 54, 111, 122
See application file for complete search history.

(56) References Cited

U.S. PATENT DOCUMENTS

| | | | | |
|---|---|---|---|---|
| 7,096,447 | B1 * | 8/2006 | Li et al. ................... | 716/112 |
| 7,853,913 | B2 * | 12/2010 | Selvaraj .................... | 716/122 |
| 2007/0256039 | A1 * | 11/2007 | White ....................... | 716/4 |
| 2009/0319968 | A1 * | 12/2009 | Wang et al. ............... | 716/5 |
| 2011/0037146 | A1 * | 2/2011 | Hierlemann .............. | 257/532 |

OTHER PUBLICATIONS

U.S. Appl. No. 11/701,807, filed Feb. 1, 2007, Arifur et al., Xilinx, Inc. 2100 Logic Drive, San Jose, CA.
U.S. Appl. No. 11/973,062, filed Oct. 4, 2007, Rahman, Arifur et al., Xilinx, Inc. 2100 Logic Drive, San Jose, CA.
U.S. Appl. No. 12/041,612, filed Mar. 3, 2008, Rahman, Arifur et al., Xilinx, Inc. 2100 Logic Drive, San Jose, CA.
U.S. Appl. No. 12/129,527, filed May 29, 2008, Wu, Paul et al., Xilinx, Inc., 2100 Logic Drive, San Jose, CA.
U.S. Appl. No. 12/392,065, filed Feb. 24, 2009, Rahman, Arifur, Xilinx, Inc. 2100 Logic Drive, San Jose, CA.
Rahman, Arifur et al., "Die Stacking Technology for Terabit Chip-to-Chip Communications", 2006 IEEE Custom Integrated Circuits Conference, Sep. 10-13, 2006, pp. 587-590, San Jose, CA.

* cited by examiner

*Primary Examiner* — Vuthe Siek
*Assistant Examiner* — Mohammed Alam
(74) *Attorney, Agent, or Firm* — Robert M. Brush; Gerald Chan

(57) ABSTRACT

Method, apparatus, and computer readable medium for designing an integrated circuit (IC) are described. In some examples, layout data describing conductive layers of the integrated circuit is obtained. The layout data is analyzed to identify through die via (TDV) areas. A metal fill pattern is created for each of the TDV areas having a maximum metal density within design rules for the integrated circuit. The metal fill pattern for each of the TDV areas is merged with the layout data.

20 Claims, 7 Drawing Sheets

CUSTOMIZING METAL PATTERN DENSITY IN DIE-STACKING APPLICATIONS

FIELD OF THE INVENTION

One or more aspects of the present invention relate generally to semiconductor devices and, more particularly, to a method and apparatus for customizing metal pattern density in die-stacking applications.

BACKGROUND OF THE INVENTION

As semiconductor technology has advanced, the amount and speed of logic available on an IC, such as an FPGA, has increased more rapidly than the number and performance of I/O connections. As a result, IC die stacking techniques have received renewed interest to address the interconnection bottleneck of high-performance systems. In stacked IC applications, two or more ICs are stacked vertically and interconnections are made between them. Such a stacked arrangement is referred to as a system-in-package (SIP).

Through die vias (TDVs) can be employed to establish interconnections between stacked ICs. A TDV is a metal via that extends through a die of one IC for coupling to interconnect of another IC. In the design of stacking-friendly ICs, regions in the device layout are dedicated to TDVs. Typically, the dedicated TDV regions in a layout do not allow any metal or active layers within a predefined distance of the TDVs. As a result, there can be low metal pattern density around the TDVs of a stacking-friendly IC. Such a low metal pattern density can result in low chemical metal polishing (CMP) efficiency and variation in interconnect height among the metal layers of the interconnect. In particular, the metal height variation can accumulate over several metal layers, which can cause port depth of focus around TDVs during optical lithography.

Accordingly, there exists a need in the art for a method and apparatus for customizing metal pattern density in ICs configured for use in die stacking applications.

SUMMARY OF THE INVENTION

Method, apparatus, and computer readable medium for designing an integrated circuit (IC) are described. In one embodiment of the method, layout data describing conductive layers of the integrated circuit is obtained. The layout data is analyzed to identify through die via (TDV) areas. A metal fill pattern is created for each of the TDV areas having a maximum metal density within design rules for the integrated circuit. The metal fill pattern for each of the TDV areas is merged with the layout data.

In this embodiment, the metal fill pattern can include a fill layer for each of a plurality of the conductive layers in the layout data. The step of creating can include initially defining the metal fill pattern for each of the TDV areas using metal segments having maximum metal width and minimum metal spacing as set forth in the design rules, and adjusting, for one or more of the TDV areas, the metal fill pattern thereof to eliminate one or more violations of the design rules while maximizing metal fill density. The step of adjusting can include defining, for the one or more TDV areas, one or more holes in the metal fill pattern thereof. The minimum metal spacing can include one of a minimum spacing between metal segments or a minimum spacing between metal segments and TDVs. The step of initially defining can comprise laying out, for each of the TDV areas, one or more grids of the metal segments comporting with the maximum metal width and the minimum metal spacing as set forth in the design rules. The method further includes generating a description of the layout data on one or more masks for manufacturing the integrated circuit.

An embodiment of an apparatus for designing an integrated circuit includes means for obtaining layout data describing conductive layers of the integrated circuit; means for analyzing the layout data to identify through die via (TDV) areas; means for creating a metal fill pattern for each of the TDV areas, where portions of the metal fill pattern have a largest metal width and a closest metal spacing within design rules for the integrated circuit; and means for merging the metal fill pattern for each of the TDV areas with the layout data.

In this embodiment, the metal fill pattern includes a fill layer for each of the conductive layers in the layout data. The means for creating includes means for initially defining the metal fill pattern for each of the TDV areas using maximum metal width and minimum metal spacing as set forth in the design rules, and also means for adjusting, for one or more of the TDV areas, the metal fill pattern thereof to eliminate one or more violations of the design rules while maximizing metal fill density. The means for adjusting includes means for defining, for the one or more TDV areas, one or more holes in the metal fill pattern thereof. The minimum metal spacing includes one of a minimum spacing between metal segments or a minimum spacing between metal segments and TDVs. The means for initially defining includes means for laying out, for each of the TDV areas, one or more grids of metal segments comporting with the maximum metal width and the minimum metal spacing as set forth in the design rules. The apparatus further includes means for generating a description of the layout data on one or more masks for manufacturing the integrated circuit.

An embodiment of a computer readable medium having instructions stored thereon that when executed by a processor cause the processor to perform a method of designing an integrated circuit that includes obtaining layout data describing conductive layers of the integrated circuit, and analyzing the layout data to identify through die via (TDV) areas. The method further includes creating a metal fill pattern for each of the TDV areas, where portions of the metal fill pattern have a largest metal width and a closest metal spacing within design rules for the integrated circuit, and also merging the metal fill pattern for each of the TDV areas with the layout data.

In this embodiment, the metal fill pattern can include a fill layer for each of the conductive layers in the layout data. The step of creating includes initially defining the metal fill pattern for each of the TDV areas using maximum metal width and minimum metal spacing as set forth in the design rules, and also adjusting, for one or more of the TDV areas, the metal fill pattern thereof to eliminate one or more violations of the design rules while maximizing metal fill density.

The step of adjusting includes defining, for the one or more TDV areas, one or more holes in the metal fill pattern thereof. The minimum metal spacing includes one of a minimum spacing between metal segments or a minimum spacing between metal segments and TDVs. The step of initially defining includes laying out, for each of the TDV areas, one or more grids of metal segments comporting with the maximum metal width and the minimum metal spacing as set forth in the design rules.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 1:
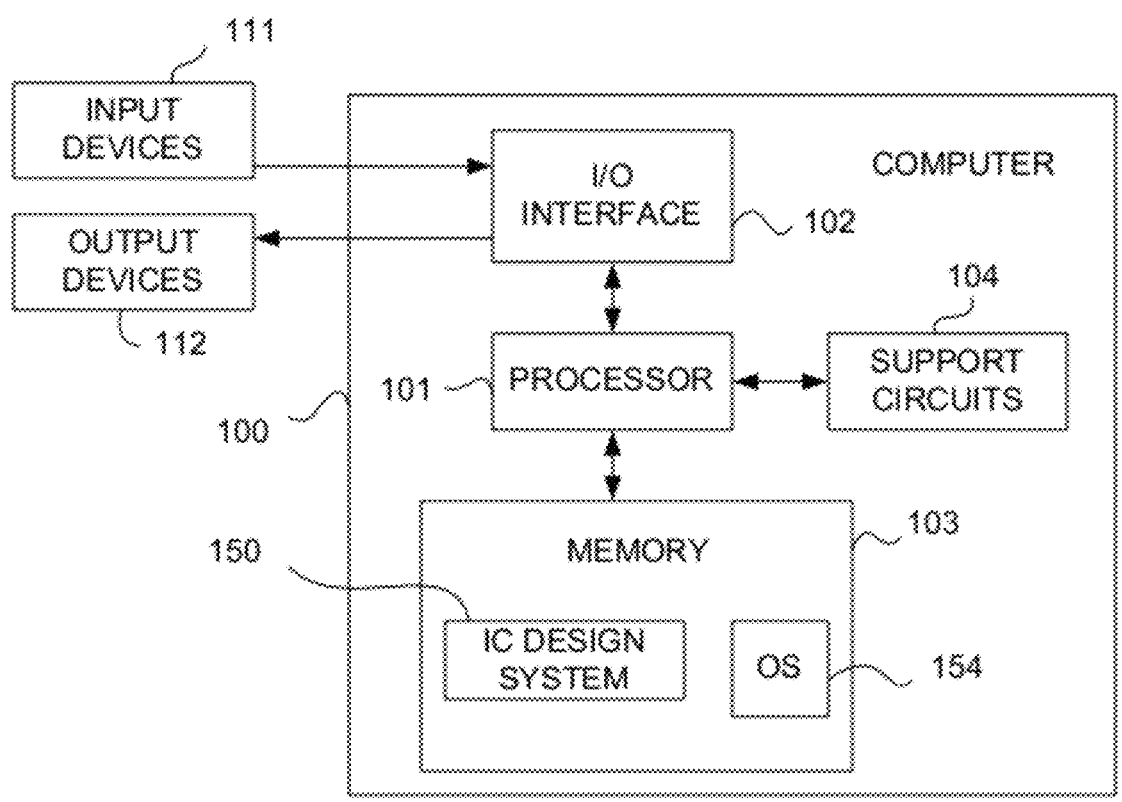
FIG. 1 is a block diagram depicting an exemplary embodiment a computer suitable for implementing the processes described herein in accordance with one or more aspects of the invention.

FIG. 1 is a block diagram depicting an exemplary embodiment a computer 100 suitable for implementing the processes described herein in accordance with one or more aspects of the invention. The computer 100 includes a processor 101, a memory 103, various support circuits 104, and an I/O interface 102. The processor 101 may include one or more microprocessors known in the art. The support circuits 104 for the processor 101 include conventional cache, power supplies, clock circuits, data registers, I/O interfaces, and the like. The I/O interface 112 may be directly coupled to the memory 103 or coupled through the processor 101. The I/O interface 102 is coupled to various input devices 111 (e.g., keyboard, mouse, and the like) and output devices 112 (e.g., display, printer, and the like).

The memory 103 may store processor-executable instructions and/or data that may be executed by and/or used by the processor 101. These processor-executable instructions may comprise hardware, firmware, software, and the like, or some combination thereof. Modules having processor-executable instructions that are stored in the memory 103 include an integrated circuit (IC) design system 150. The computer 100 may be programmed with an operating system 154, which may be any type of operating system known in the art. At least a portion of an operating system 154 may be disposed in the memory 103. The memory 103 may include one or more of the following random access memory, read only memory, magneto-resistive read/write memory, optical read/write memory, cache memory, magnetic read/write memory, and the like, as well as computer readable media as described below.

An aspect of the invention is implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

Figure 2:
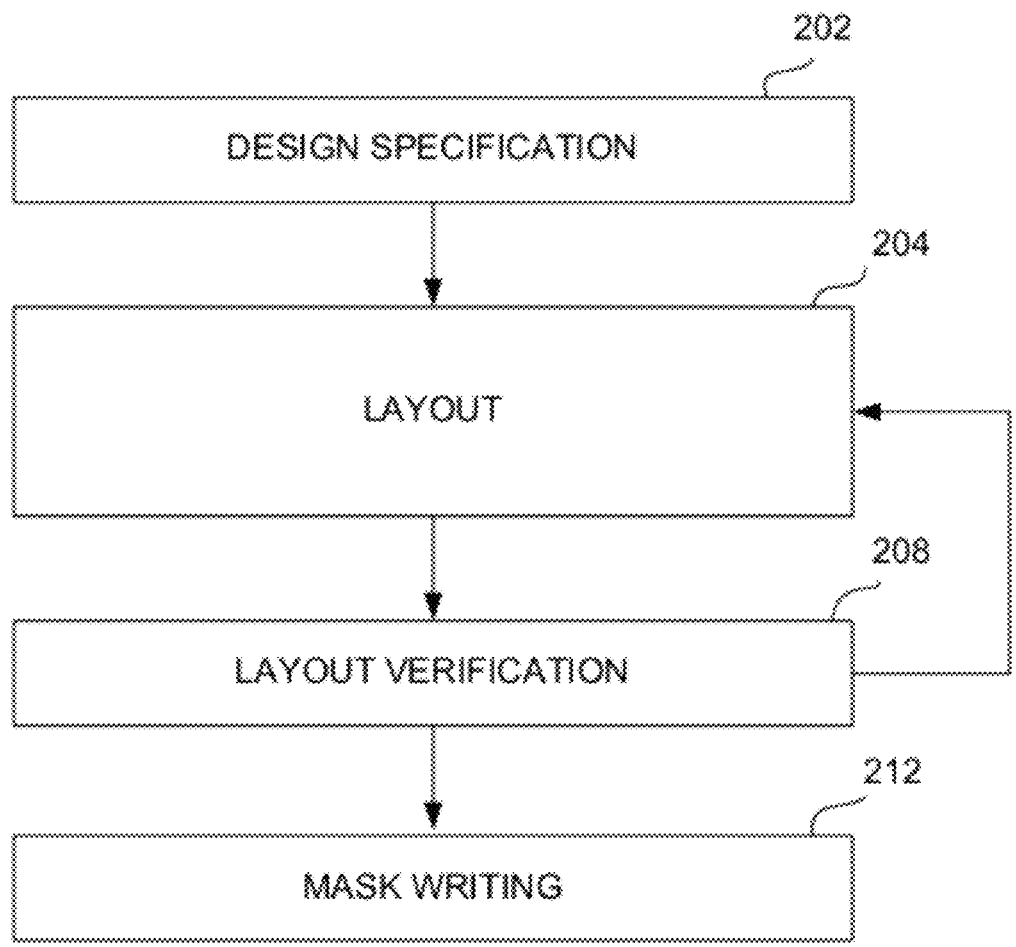
FIG. 2 is a block diagram depicting an exemplary embodiment of an IC design system in accordance with one or more aspects of the invention.

FIG. 2 is a block diagram depicting an exemplary embodiment of an IC design system 150 in accordance with one or more aspects of the invention. The system 150 includes a design specification module 202, a layout module 204, a layout verification module 208, and a mask writing module 212. The design specification module 202 is configured to establish a set of specifications of an IC design and produce a transistor-level and/or gate-level description of the design. The specifications typically describe the expected functionality of the design and may define values for various parameters, such as maximum allowable delay times, setup and hold time, operation frequency, operation conditions, silicon area constraints, power dissipation constraints, and the like. The design specification module 202 may provide a schematic editor or other type of editor that allows a designer to draw, place, and connect individual circuit components to generate the transistor-level and/or gate-level description, referred to as a netlist.

The layout module 204 generates layout data for the design in response to the netlist. The layout data describes geometries and relative positioning of mask layers (layers) to be used in actual fabrication of circuitry and conductive interconnect for the integrated circuit. The layout data also includes cells, which define sets of particular devices within the integrated circuit. Cells typically contain all the polygons on all the layers required for the fabrication of the respective devices. Cells can be nested within other cells, often in very intricate arrangements. The structure of cells provides a hierarchy. Typical formats for the polygons of the layout data are GDS II (Graphic Design System II) or CIF (Caltech Intermediate Format).

The layout verification module 208 is configured to process the layout data from the layout module 204. Once the layout module 204 creates a layout, the layout verification module 208 verifies the layout. Verification includes ensuring that the transformation from netlist to layout has been properly executed and that the layout created adheres to certain geometric design rules. Such layout verification operations are often referred to as layout versus schematic (LVS) and design rule check (DRC) operations. If the layout verification module 208 detects errors in the layout data, the layout module 204 may be invoked to modify the layout data to correct the errors. In some cases, the errors are such that the design specification module 202 must be invoked to modify the design. The mask writing module 212 generates a description of the layout data on masks for manufacturing of ICs.

Figure 3:
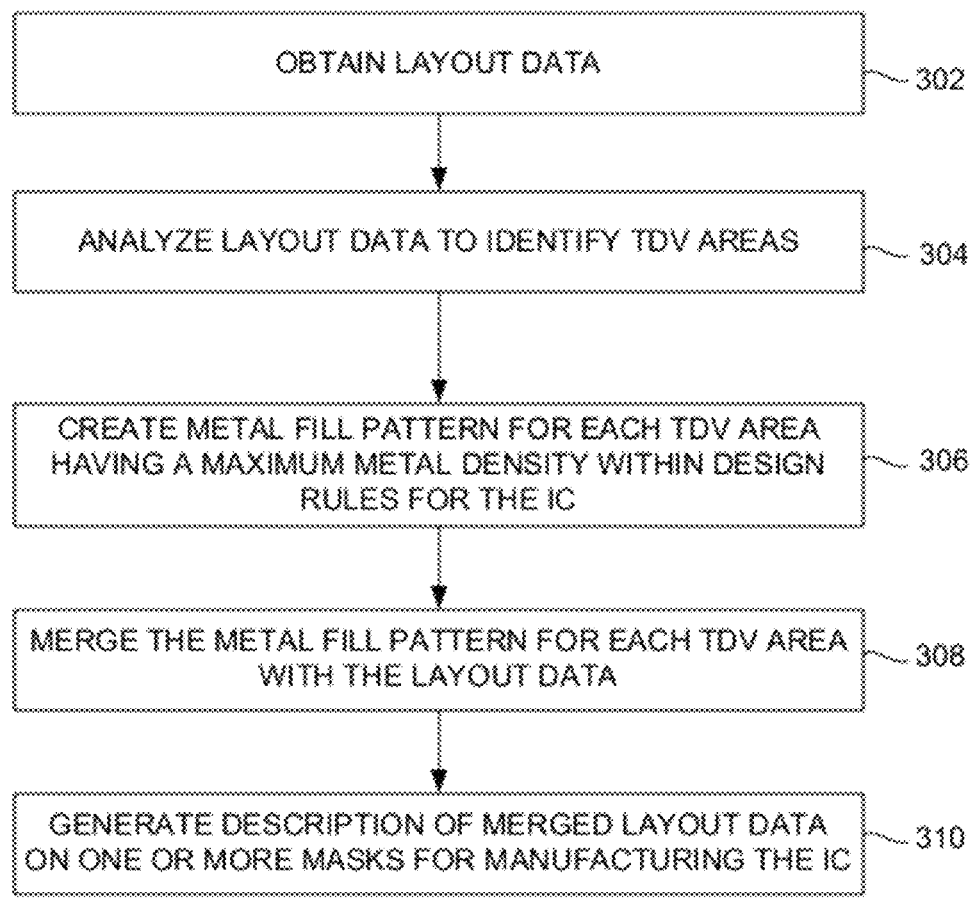
FIG. 3 is a flow diagram depicting a method of designing an IC according to some embodiments of the invention.

FIG. 3 is a flow diagram depicting a method 300 of designing an IC according to some embodiments of the invention. The method 300 may be performed by the IC design system 150. For example, the method 300 may be performed by the layout module 204, the layout verification module 208, or both. Alternatively, the method 300 may be performed by a separate module or in combination with one or more of the layout module 204 and/or the layout verification module 208.

The method 300 begins at step 302, where layout data describing conductive layers of the IC are obtained. For example, the layout data may be obtained from the layout module 204 in response to the design specifications (also referred to as "original layout data"). The layout data may include a pattern of conductors for each of a plurality of layers (e.g., modern ICs may include as many as 12 layers). A conductive layer may include metal, polysilicon, or the like.

At step 304, the layout data is analyzed to identify through die via (TDV) areas. As described above, an IC may include special vias that extend between the face side and the backside of the IC, which are referred to as TDVs (as opposed to vias that connect one conductive layer to another on the face of the IC). TDVs can be employed in die stacking applications. The layout data of the IC may include reserved areas within the conductive interconnect where one or more TDVs are to be formed. The layout data of the IC may be understood with reference to the following exemplary drawings. The TDV areas may be identified automatically by processing the layout data.

Figure 4:
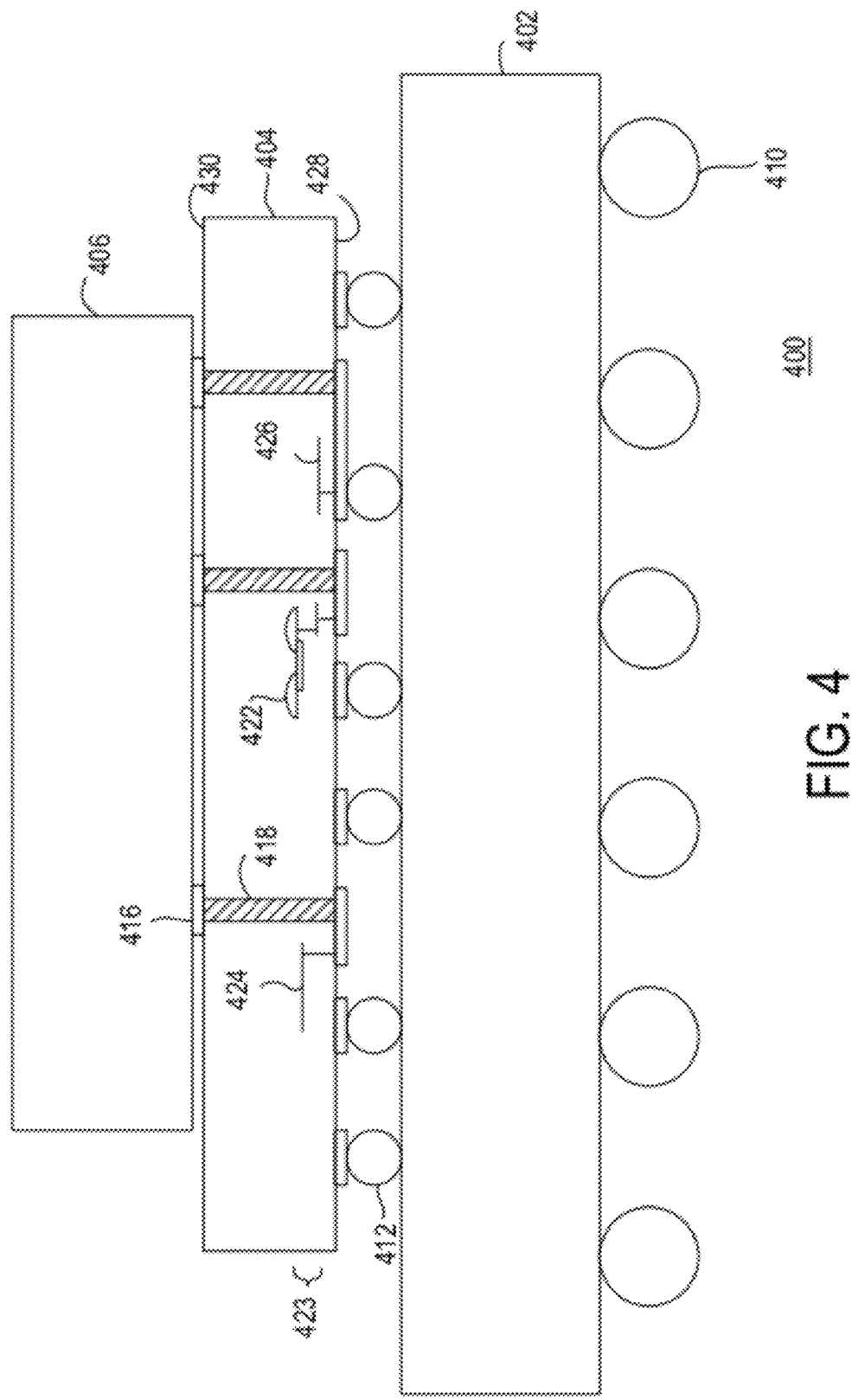
FIG. 4 is a cross-section of an exemplary semiconductor device.

FIG. 4 is a cross-section of an exemplary semiconductor device 400. The semiconductor device 400 includes a carrier substrate 402, a primary IC die 404, and a daughter IC die 406. The carrier substrate 402 may provide a package for the primary IC die 404 and the daughter IC die 406. The primary IC die 404 and the daughter IC die 406 may comprise any type of ICs known in the art. In some embodiments, the primary IC die 404 comprises a field programmable gate array (FPGA) and the daughter IC die 406 comprises any type of analog, digital, or mixed signal IC, such as a random access memory (RAM). Such embodiments, however, are just some of a myriad of possible combinations of known ICs.

The carrier substrate 402 includes an array of solder balls 410 (e.g., a ball grid array (BGA)) that can be electrically and mechanically coupled to a circuit board or like type substrate (not shown) for conducting electrical signals. The primary IC die 404 includes bump contacts 412 electrically coupled to the carrier substrate 402. The primary IC die 404 includes conductive interconnect 423 electrically coupled to active circuitry (symbolized as element 422). The bump contacts 412, conductive interconnect 423, and the active circuitry 422 can be formed on a face side 428 of the primary IC die 404. The side opposite the face side 428 is referred to as a backside 430 of the primary IC die 404.

The conductive interconnect 423 of the primary IC die 404 may include one or more conductive layers (e.g., metal and polysilicon layers). In the present example, conductive layers 424 and 426 are shown. It is to be understood that the primary IC die 404 is merely exemplary and that a practical IC die typically includes more than two conductive layers (e.g., up to 12 conductive layers). The primary IC die 404 further includes TDVs 418 extending between the backside 430 and conductive interconnect 423 on the face side 428. The TDVs 418 are exposed at the backside 430 of the primary IC die 404. The daughter IC die 406 includes inter-die contacts 416 electrically coupled to the exposed portions of the TDVs 418. The inter-die contacts 416 communicate electrical signals between the primary IC die 404 and the daughter IC die 406. In some embodiments, the inter-die contacts 416 may comprise micro-pads or like type contacts.

Figure 5:
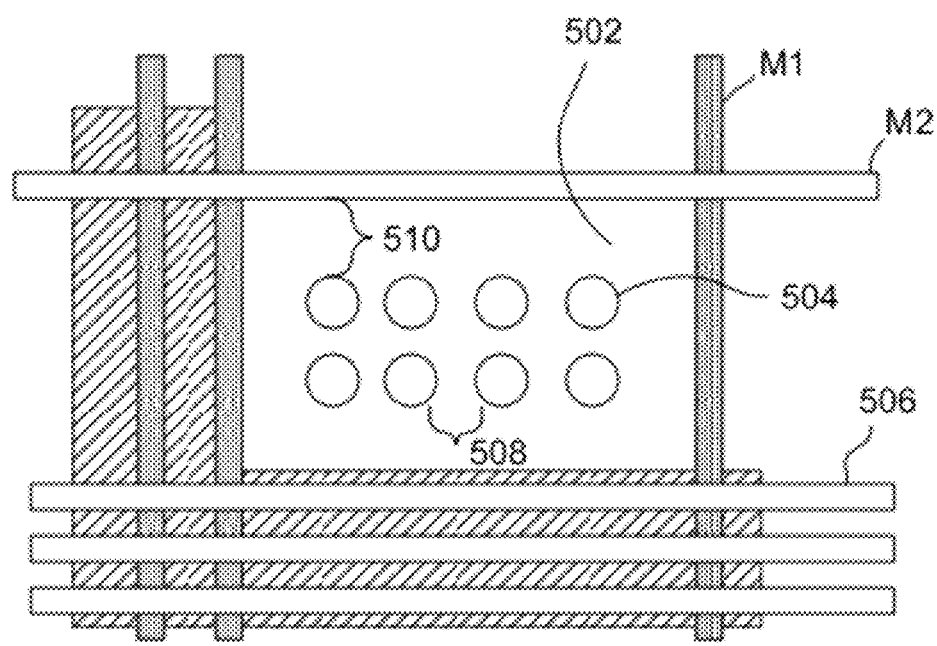
FIG. 5 is a top-view schematic view of an exemplary layout.

FIG. 5 is a top-view schematic view of an exemplary layout 500. The layout 500 may represent a portion of a complete layout of the conductive interconnect of an IC, such as the primary IC die 404 shown in FIG. 4. The layout 500 includes a TDV area 502 for accommodating a plurality of TDVs 502 (e.g., a 2×4 array of TDVs is shown). The TDV area 502 is defined within conductive routing 506, e.g., metal 1 (M1) and metal 2 (M2) conductor layers are shown by way of example. The TDVs are separated by a distance 508, referred to as TDV-to-TDV spacing. Each TDV is separated from metal segments of the conductive routing 506 by a distance 510, referred to as TDV-to-metal spacing. The TDV-TDV spacing and the TDV-to-metal spacing can be constrained by design rules for the IC. For example, the design rules may define maximum and/or minimum values (i.e., constraints) for various geometric parameters, including the TDV-to-TDV and TDV-to-metal spacings. As is known in the art, the design rules may define maximum and/or minimum values for other geometry parameters, such as metal-to-metal spacing, metal width, and the like.

In particular, the TDV-to-TDV spacing and the TDV-to-metal spacing constraints are developed to account for alignment inaccuracy during TDV fabrication, to reduce signal coupling from TDVs to the active layer, and to prevent shorts between TDVs and active circuits. During design verification, metal pattern density can be estimated using a sliding bounding box of particular dimensions. As noted above, without compensation, TDV design constraints can cause low metal pattern density around the TDVs. If metal pattern density is less than approximately 10%, the height of the metal interconnect can differ from its target value by as much as 5%. As the difference in metal height accumulates over multiple layers, the surface non-uniformity in upper metal layers can become comparable to the depth of focus of the optical lithography process. Such poor depth of focus can affect the resolution of metal patterns in the upper metal layers, resulting in lower manufacturing yield of the ICs. Accordingly, in some embodiments, layout data for an IC is compensated during design (automatically in some embodiments) with dummy metal fill patterns around TDVs to increase metal density. By increasing metal density around TDVs, manufacturing yield of the ICs may be improved.

Returning to FIG. 3, at step 306, a metal fill pattern is created for each of the TDV areas having a maximum metal density within design rules for the IC. A "metal fill pattern" is, e.g., a pattern of metal segments that does not form part of the electrical specification of the IC (e.g., a "dummy" pattern). The metal fill pattern may include a fill layer for one or more of the conductive layers in the layout data. The patterns of the fill layers in a metal fill pattern may be the same or may differ from one fill layer to the next. Area-efficient custom dummy fills can be created that use maximum metal widths and minimum metal spacings (e.g., metal-to-metal and TDV-to-metal spacings) as much as possible within the confines of the design rules. The metal fill patterns may be created automatically in response to the identified TDV areas in the layout data.

At step 308, the metal fill pattern for each of the TDV areas within the layout data are merged with the original layout data (also referred to as "merged layout data"). At step 310, a description of the merged layout data can be generated on one or more masks for manufacturing the IC.

Figure 6:
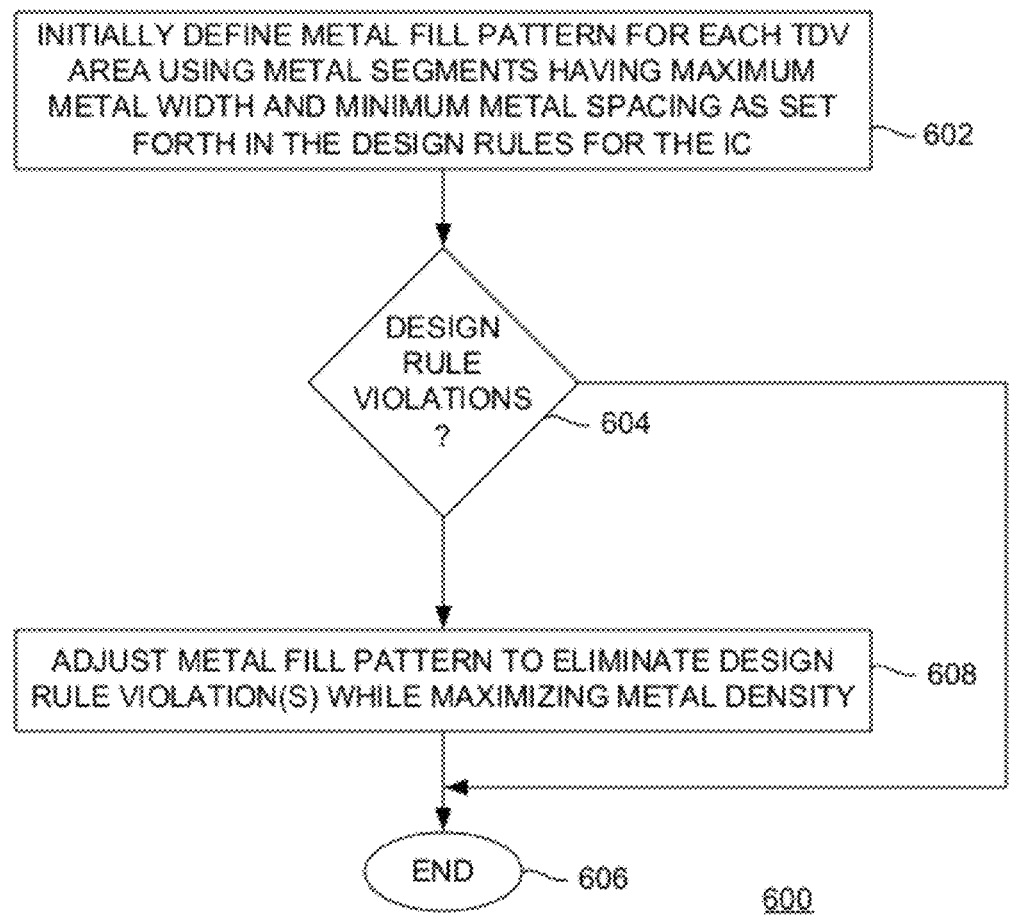
FIG. 6 is a flow diagram depicting a method of creating metal fill patterns according to some embodiments of the invention.

FIG. 6 is a flow diagram depicting a method 600 of creating metal fill patterns according to some embodiments of the invention. The method 600 may be performed as part of step 306 of the method 300. The method 600 begins at step 602, where the metal fill pattern for each of the TDV areas is initially defined using metal segments having maximum metal width and minimum metal spacing as set forth in the design rules for the IC. The minimum metal spacing may include minimum spacing between metal segments (e.g., metal-to-metal spacing) and/or minimum spacing between metal segments and TDVs (e.g., TDV-to-metal spacing). For example, for each of the TDV areas, one or more grids of metal segments may be laid out comporting with the maximum metal width and the minimum metal spacing as set forth in the design rules.

At step 604, a determination is made whether any of the initially defined metal fill patterns violate design rules for the IC. For example, while metal segments may comport individually with the maximum width in the design rules, an intersection or combination of metal segments may result in a metal structure having a width that exceeds the maximum metal width constraint. If none of the initially defined metal fill patterns violate the design rules, the method 600 ends at step 606. Otherwise, the method 600 proceeds to step 608.

At step 608, for each of the non-conforming TDV areas, the metal fill pattern is adjusted to eliminate one or more violations of the design rules while maximizing metal fill density. For example, in some embodiments, one or more holes may be defined in the metal fill pattern to cause conformance with the design rules, while achieving maximum possible metal density.

Figure 7:
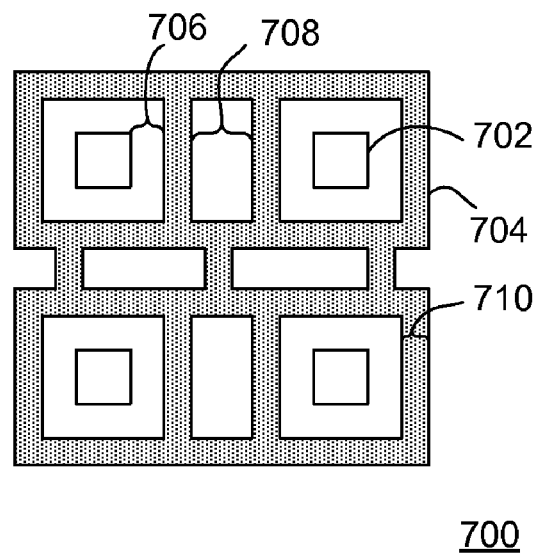
FIG. 7 is a top-view schematic of an exemplary layout according to some embodiments of the invention.

FIG. 7 is a top-view schematic of an exemplary layout 700 according to some embodiments of the invention. The layout 700 may be part of merged layout data as produced by the methods described above. The layout 700 includes a plurality of TDVs 702, e.g., four TDVs 702 are shown. The TDVs 702 are rectangular in shape (e.g., square shaped). The TDVs 702 are surrounded by a metal fill pattern 704 created using the methods described above. A TDV-to-metal distance 706 can be set according to the minimum TDV-to-metal spacing constraint of the IC design rules. A metal-to-metal distance 708 can be set according to the minimum metal-to-metal spacing constraint of the IC design rules. A metal width 710 can be set according to the maximum metal width constraint of the IC design rules. In this manner, the metal density of the metal fill pattern is maximized, while still conforming with the IC design rules.

Figure 8:
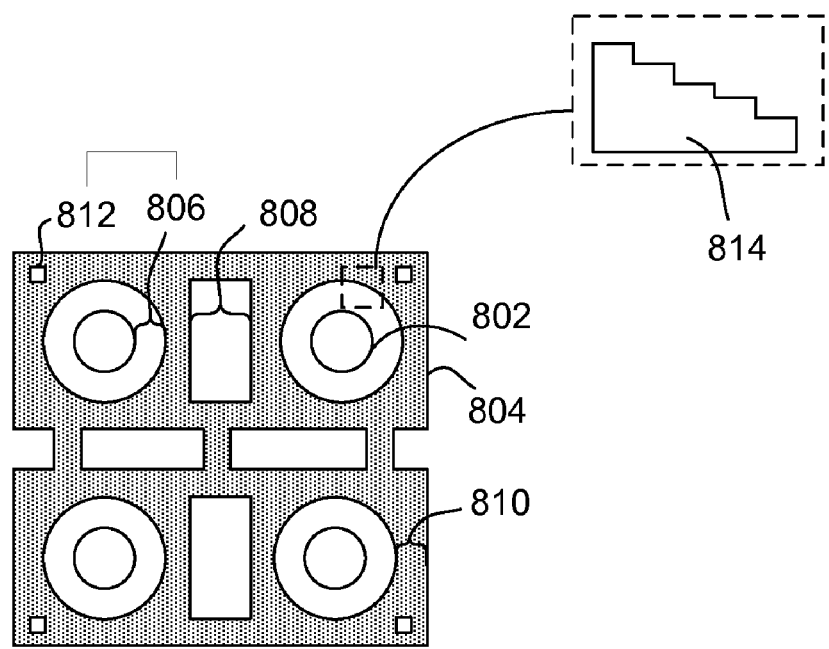
FIG. 8 is a top-view schematic of an exemplary layout according to some embodiments of the invention.

FIG. 8 is a top-view schematic of an exemplary layout 800 according to some embodiments of the invention. The layout 800 may be part of merged layout data produced by the methods described above. The layout 800 includes a plurality of TDVs 802, e.g., four TDVs 802 are shown. The TDVs 802 can be circular or polygonal (e.g., hexagonal, octagonal, etc.). The TDVs 802 are surrounded by a metal fill pattern 804 created using the methods described above. A TDV-to-metal distance 806 can be set according to the minimum TDV-to-metal spacing constraint of the IC design rules. A metal-to-metal distance 808 can be set according to the minimum metal-to-metal spacing constraint of the IC design rules. A metal width 810 can be set according to the maximum metal width constraint of the IC design rules. In the present example, the intersection of metal segments results in the metal width exceeding the maximum allowable width in the design rules. As such, holes 812 are defined in order to eliminate design rule violations with respect to the metal width constraint. In this manner, the metal density of the metal fill pattern is maximized, while still conforming with the IC design rules. The layout 800 includes a plurality of fill layers 814 (one for each conductor layer). An exploded view 850 shows a cross-section of the fill layers 814 in a region surrounding a TDV. As shown, the TDV-to-metal distance 806 may progressively increase from fill layer-to-fill layer (from lower to upper layers).

The layouts 700 and 800 are merely exemplary. It is to be understood that the methods described above may be used to produce several different metal fill patterns surrounding TDVs similar to the layouts 700 and 800.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. A method of designing an integrated circuit, comprising:
   obtaining layout data describing conductive layers of the integrated circuit;
   analyzing the layout data to identify through die via (TDV) areas;
   creating a metal fill pattern for each of the TDV areas using a processor, the metal fill pattern having a maximum metal density within design rules for the integrated circuit, wherein one of the metal fill patterns comprises a portion that corresponds with a space between two TDVs in one of the TDV areas; and
   merging the metal fill pattern for each of the TDV areas with the layout data.

2. The method of claim 1, wherein the metal fill pattern includes a fill layer for each of a plurality of the conductive layers in the layout data.

3. The method of claim 1, wherein the step of creating comprises:
   initially defining the metal fill pattern for each of the TDV areas using metal segments having maximum metal width and minimum metal spacing as set forth in the design rules; and
   adjusting, for one or more of the TDV areas, the metal fill pattern thereof to eliminate one or more violations of the design rules while maximizing metal fill density.

4. The method of claim 3, wherein the step of adjusting comprises:
   defining, for the one or more TDV areas, one or more holes in the metal fill pattern thereof.

5. The method of claim 3, wherein the minimum metal spacing includes one of: a minimum spacing between metal segments or a minimum spacing between metal segments and TDVs.

6. The method of claim 3, wherein the step of initially defining comprises:
   laying out, for each of the TDV areas, one or more grids of the metal segments comporting with the maximum metal width and the minimum metal spacing as set forth in the design rules.

7. The method of claim 1, further comprising:
   generating a description of the layout data on one or more masks for manufacturing the integrated circuit.

8. A computer readable non-transitory medium having instructions stored thereon that when executed by a processor cause the processor to perform a method of designing an integrated circuit, comprising:
   obtaining layout data describing conductive layers of the integrated circuit;
   analyzing the layout data to identify through die via (TDV) areas;
   creating a metal fill pattern for each of the TDV areas, wherein portions of the metal fill pattern have a largest metal width and a closest metal spacing within design rules for the integrated circuit, wherein one of the metal fill patterns comprises a portion that corresponds with a space between two TDVs in one of the TDV areas; and
   merging the metal fill pattern for each of the TDV areas with the layout data.

9. The computer readable medium of claim 8, wherein the metal fill pattern includes a fill layer for each of a plurality of the conductive layers in the layout data.

10. The computer readable medium of claim 8, wherein the step of creating comprises:
    initially defining the metal fill pattern for each of the TDV areas using maximum metal width and minimum metal spacing as set forth in the design rules; and
    adjusting, for one or more of the TDV areas, the metal fill pattern thereof to eliminate one or more violations of the design rules while maximizing metal fill density.

11. The computer readable medium of claim 10, wherein the step of adjusting comprises:
defining, for the one or more TDV areas, one or more holes in the metal fill pattern thereof.

12. The computer readable medium of claim 10, wherein the minimum metal spacing includes one of: a minimum spacing between metal segments or a minimum spacing between metal segments and TDVs.

13. The computer readable medium of claim 10, wherein the step of initially defining comprises:
laying out, for each of the TDV areas, one or more grids of metal segments comporting with the maximum metal width and the minimum metal spacing as set forth in the design rules.

14. A semiconductor device, comprising:
an integrated circuit die;
a TDV area for the integrated circuit die, the TDV area having a TDV; and
a metal fill for the TDV area, the metal fill located next to the TDV;
wherein the metal fill has a configuration that is based on a configuration of the TDV; and
wherein the TDV area has an additional TDV, and the metal fill comprises a portion that is between the TDV and the additional TDV.

15. The semiconductor device of claim 14, wherein at least a part of the metal fill surrounds at least two sides of the TDV.

16. The semiconductor device of claim 14, wherein at least a part of the metal fill defines an opening that circumferentially surrounds the TDV.

17. The semiconductor device of claim 16, wherein the opening has a circular shape.

18. The semiconductor device of claim 16, wherein the opening has a square shape.

19. The semiconductor device of claim 14, wherein the metal fill includes a hole that has no metal therein.

20. The semiconductor device of claim 14, wherein the metal fill includes a plurality of fill layers that correspond with respective conductive layers for the integrated circuit die.

* * * * *